US009661289B2

United States Patent
Koike

(10) Patent No.: US 9,661,289 B2
(45) Date of Patent: May 23, 2017

(54) MONITOR AND VIDEO SIGNAL DISPLAY METHOD

(71) Applicant: JVC KENWOOD Corporation, Yokohama-shi, Kanagawa (JP)

(72) Inventor: Tsutomu Koike, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/223,610

(22) Filed: Jul. 29, 2016

(65) Prior Publication Data

US 2016/0337629 A1 Nov. 17, 2016

Related U.S. Application Data

(63) Continuation of application No. PCT/JP2014/075385, filed on Sep. 25, 2014.

(30) Foreign Application Priority Data

Mar. 18, 2014 (JP) .................................. 2014-054328

(51) Int. Cl.
H04N 7/01 (2006.01)
H04N 9/67 (2006.01)
(Continued)

(52) U.S. Cl.
CPC .............. H04N 9/646 (2013.01); G01J 3/506 (2013.01); G09G 3/20 (2013.01); G09G 3/2003 (2013.01);
(Continued)

(58) Field of Classification Search
CPC ............ H04N 9/646; H04N 9/67; H04N 7/01; H04N 1/60; G09G 3/26; G09G 3/2003;
(Continued)

(56) References Cited

U.S. PATENT DOCUMENTS

2007/0153020 A1* 7/2007 Inoue ................... H04N 1/6019
345/591
2011/0026817 A1* 2/2011 Edge ....................... H04N 1/60
382/165

FOREIGN PATENT DOCUMENTS

JP 9-172649 A 6/1997
JP 2003-244464 A 8/2003
(Continued)

OTHER PUBLICATIONS

Form PCT/ISA/210 issued in corresponding international application No. PCT/JP2014/075385 mailed Dec. 16, 2014.
(Continued)

*Primary Examiner* — Sherrie Hsia
(74) *Attorney, Agent, or Firm* — Nath, Goldberg & Meyer; Jerald L. Meyer

(57) ABSTRACT

An RGB video signal is generated by illuminating an object with light from a first monitor and capturing an image of the object with a camera. The second monitor holds a profile representing the correspondence relationship between R, G, and
B values generated by displaying an image including values of R, G, and B on a reference monitor and capturing an image of the displayed image with the camera and X, Y, and Z values which are measurements of tristimulus values of the displayed image in the XYZ color space. The second monitor converts the first R, G, and B values of the video signal to first X, Y, and Z values based on the profile, and converts the first X, Y, and Z values to second R, G, and B values appropriate for the second monitor to display an image of the object on a display unit.

6 Claims, 4 Drawing Sheets

(51) Int. Cl.
- *H04N 9/64* (2006.01)
- *G09G 3/20* (2006.01)
- *G09G 3/36* (2006.01)
- *G09G 5/02* (2006.01)
- *G01J 3/50* (2006.01)
- *H04N 1/60* (2006.01)
- *G09G 5/10* (2006.01)

(52) U.S. Cl.
CPC ................. *G09G 3/36* (2013.01); *G09G 5/02* (2013.01); *G09G 5/10* (2013.01); *H04N 1/60* (2013.01); *H04N 7/01* (2013.01); *H04N 9/67* (2013.01); *G09G 2340/06* (2013.01); *G09G 2360/145* (2013.01)

(58) Field of Classification Search
CPC .. G09G 3/20; G09G 3/36; G09G 5/02; G09G 5/10
USPC ........ 348/453, 441, 661, 708; 345/600, 603, 345/604
IPC ....................................... H04N 7/01, 9/64, 9/67
See application file for complete search history.

(56) References Cited

FOREIGN PATENT DOCUMENTS

| | | |
|---|---|---|
| JP | 2007304618 A | 11/2007 |
| JP | 2010268065 A | 11/2010 |
| JP | 2011024202 A | 2/2011 |
| JP | 2013141245 A | 7/2013 |

OTHER PUBLICATIONS

Form PCT/ISA/237 issued in corresponding international application No. PCT/JP2014/075385 mailed Dec. 16, 2014.

\* cited by examiner

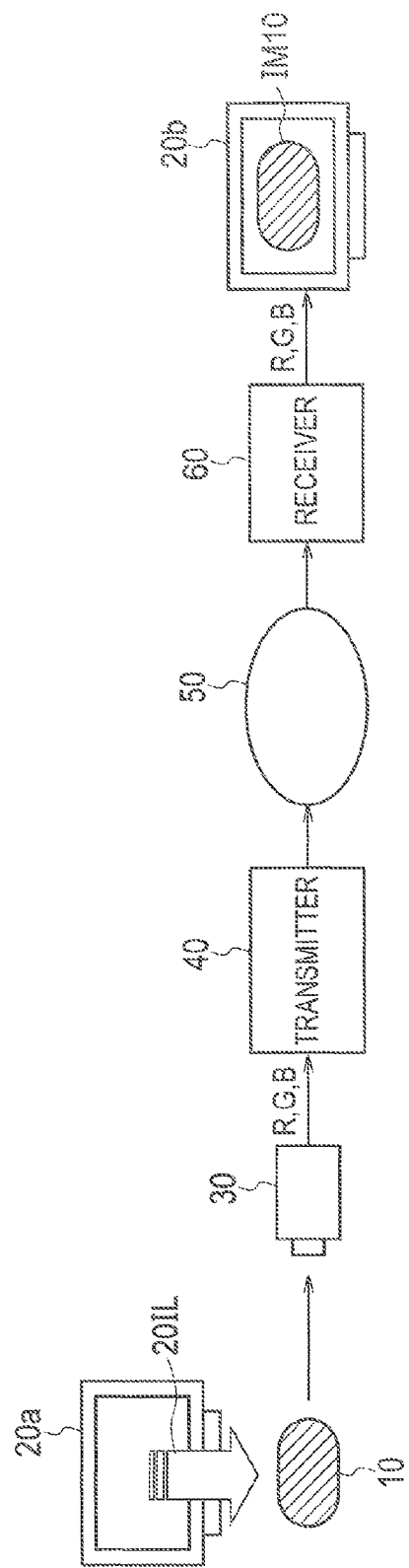

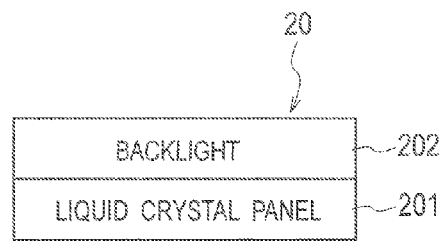
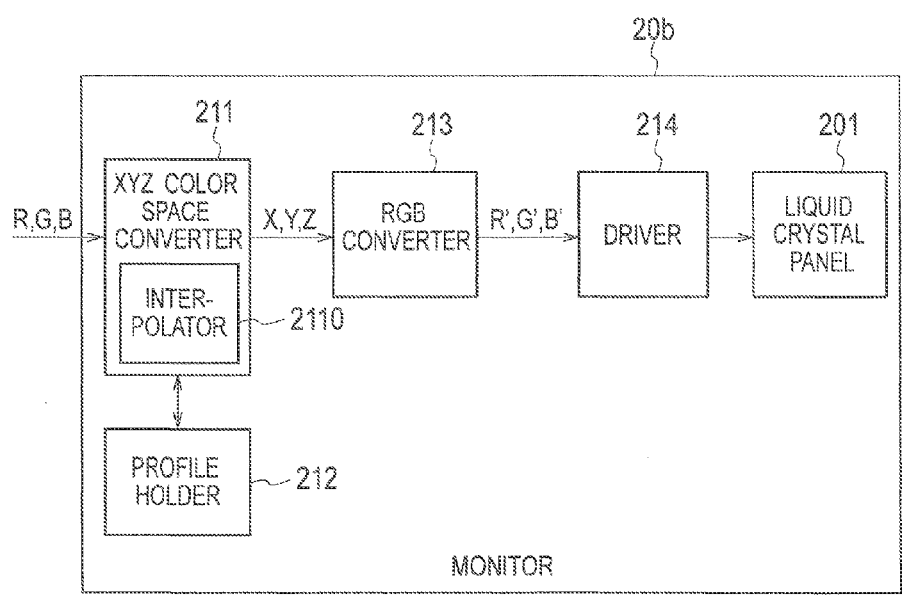

| R | G | B | X | Y | Z |
|---|---|---|---|---|---|
| 0 | 0 | 0 | * | * | * |
| 16 | 0 | 0 | * | * | * |
| 32 | 0 | 0 | * | * | * |
| ⋮ | ⋮ | ⋮ | ⋮ | ⋮ | ⋮ |
| 255 | 0 | 0 | * | * | * |
| 0 | 16 | 0 | * | * | * |
| 0 | 32 | 0 | * | * | * |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| 255 | 255 | 255 | * | * | * |

PF1

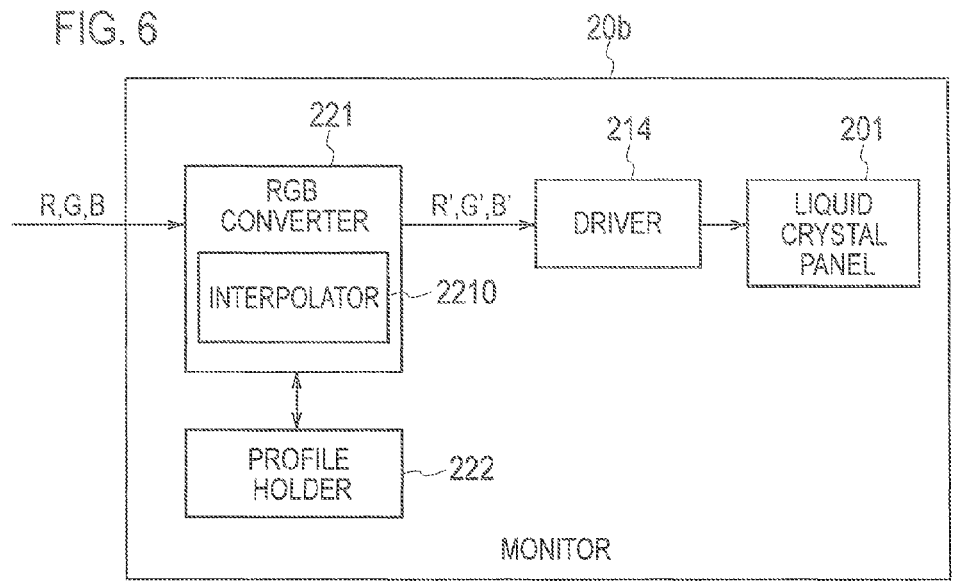

MONITOR AND VIDEO SIGNAL DISPLAY METHOD

CROSS REFERENCE TO RELATED APPLICATION

This application is a Continuation of PCT Application No. PCT/JP2014/075385, filed on Sep. 25, 2014, and claims the priority of Japanese Patent Application No. 2014-054328, filed on Mar. 18, 2014, the entire contents of both of which are incorporated herein by reference.

BACKGROUND

The present disclosure relates to a monitor displaying a video signal and a video signal display method.

A camera captures an image of an object, and a monitor displays the image based on the video signal outputted from the camera. In this case, the colors expressed by the image of the object displayed on the monitor are often different from the colors that are visually recognized by the observer.

There is a demand for displaying an image of an object on a monitor with the same colors as those of an object visually recognized by the observer. In order to address the demand, Japanese Unexamined Patent Application Publication No. 9-172649 (Patent Document 1) describes that an image of an object is captured by using a multispectral camera.

A normal camera decomposes colors of an object into three primary colors: R (red), G (green), and B (blue), to generate an RGB video signal. In other words, a normal camera represents the colors of an object using three spectra of red, green, and blue. On the other hand, the multispectral camera represents more than three colors of an object with multiple spectra (for example, six spectrums).

SUMMARY

The display on a monitor using a video signal generated by capturing an image of an object with a multispectral camera involves the following problem. The multispectral camera is a special camera. Therefore, the monitor needs to be a special monitor that can handle multiple spectra, instead of a normal monitor expressing colors with red, green, and blue.

The method described in Patent Document 1 can address the aforementioned demand in principle, but is difficult to implement in practice.

Accordingly, it is necessary to display an image of an object on the monitor with the same colors as those of the object that is recognized by the observer, by using a normal camera generating an RGB video signal, and a normal monitor displaying an RGB video signal.

A first aspect of the embodiments provides a monitor including: a profile holder configured to hold a profile representing the correspondence relationship between R, G, and B values of an RGB signal generated by displaying an image including a plurality of R, G, and B values on a reference monitor and capturing an image of the displayed image with a camera, and X, Y, and Z values which are measurements of tristimulus values of the displayed image in an XYZ color space; an XYZ color space converter configured to convert to first X, Y, and Z values based on the profile, first R, G, and B values of an RGB signal generated by capturing an image of an object with the camera, while illuminating the object with only light emitted from a reference monitor or with only light emitted from a light source of a reference monitor as illumination light, without illuminating the object with external light; an RGB converter configured to convert the first X, Y, and Z values to second R, G, and B values appropriate for a subject monitor as a reference monitor; and a driver configured to drive a display unit of the subject monitor to display an image of the object based on the RGB signal including the second R, G, and B values on the display unit.

A second aspect of the embodiments provides a monitor including: a profile holder configured to hold a profile representing the correspondence relationship between R, G, and B values of an RGB signal generated by displaying an image including a plurality of R, G, and B values on a reference monitor and capturing an image of the displayed image with a camera, and R, G, and B values which are appropriate for a subject monitor as a reference monitor and are obtained by converting the X, Y, and Z values that are measurements of tristimulus values of the displayed image in an XYZ color space; an RGB converter configured to convert to second R, G, and B values appropriate for the subject monitor based on the profile, first R, G, and B values of an RGB signal generated by capturing an image of an object with the camera, while illuminating the object with only light emitted from a reference monitor or with only light emitted from a light source of a reference monitor as illumination light, without illuminating the object with external light; and a driver configured to drive a display unit of the subject monitor to display an image of the object based on the RGB signal including the second R, G, and B values on the display unit.

A third aspect of the embodiments provides a video signal display method, including: generating an RGB video signal by capturing an image of an object with a camera, while illuminating the object with only light emitted from a first monitor as a reference monitor, or only light emitted from a light source of the first monitor as illumination light, without illuminating the object with external light; supplying the generated video signal to a second monitor as the reference monitor; holding a profile representing the correspondence relationship between R, G, and B values of an RGB signal generated by displaying an image including a plurality of R, G, and B values on a reference monitor and capturing an image of the displayed image with the camera, and X, Y, and Z values which are measurements of tristimulus values of the displayed image in an XYZ color space by the second monitor; converting first R, G, and B values of the video signal to first X, Y, and Z values based on the profile by the second monitor; converting the first X, Y, and Z values to second R, G, and B values appropriate for the second monitor by the second monitor; and displaying an image of the object based on the RGB signal including the second R, G, and B values by the second monitor.

A fourth aspect of the embodiments provides a video signal display method, including: generating an RGB video signal by capturing an image of an object with a camera, while illuminating the object with only light emitted from a first monitor as a reference monitor, or only light emitted from a light source of the first monitor as illumination light, without illuminating the object with external light; supplying the generated video signal to a second monitor as the reference monitor; holding a profile representing the correspondence relationship between R, G, and B values of an RGB signal generated by displaying an image including a plurality of R, G, and B values on a reference monitor and capturing an image of the displayed image with the camera, and R, G, and B values which are appropriate for the second monitor and are obtained by converting the X, Y, and Z values that are measurements of tristimulus values of the displayed image in an XYZ color space by the second monitor; converting the first R, G, and B values of the video signal to second R, G, and B values based on the profile by the second monitor; and displaying an image of the object based on the RGB signal including the second R, G, and B values by the second monitor.

BRIEF DESCRIPTION OF THE DRAWINGS

FIG. 1 is a block diagram illustrating a configuration example of a video signal transmission and reception system to implement a video signal display method according to each embodiment.

FIG. 2 is a schematic block diagram of a liquid crystal monitor.

FIG. 3 is a block diagram illustrating a monitor according to the first embodiment.

FIG. 6 is a block diagram illustrating a monitor according to the second embodiment.

FIG. 7 is a table illustrating an example of a profile used to convert R, G, and B values to R', G', and B' values in the monitor according to the second embodiment.

DETAILED DESCRIPTION

Figures 4, 5:
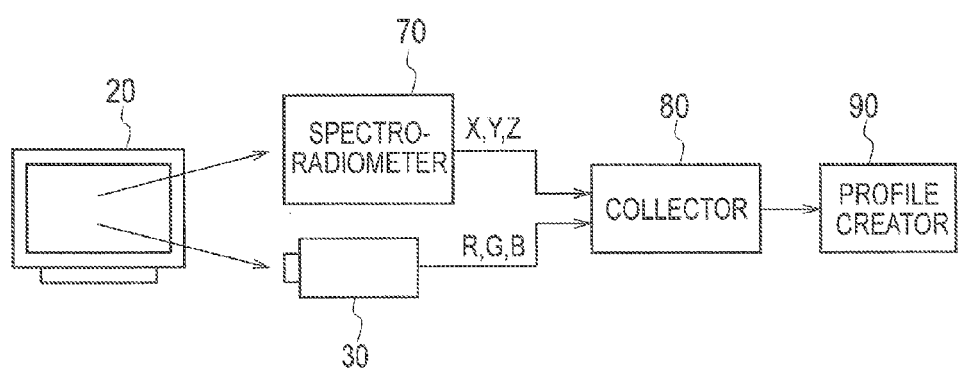
FIG. 4 is a table illustrating an example of a profile used to convert R, G, and B values to X, Y, and Z values in the monitor according to the first embodiment.
FIG. 5 is a block diagram for describing a method of creating the profile illustrated in FIG. 4.

Hereinafter, a description is given of a monitor and a video signal display method for each embodiment with reference to the accompanying drawings.

First Embodiment

In FIG. 1, an object 10 is irradiated with light 20IL as illumination light, emitted from a monitor 20a. It is preferable that the object 10 is prevented from being illuminated with light other than from the light 20IL.

The monitor 20a and the later-described monitor 20b, are collectively referred to as monitors 20. The monitors 20a and 20b are of the same type. The monitors 20 of the same type, used as the monitors 20a and 20b, are also referred to as reference monitors. The reference monitors 20 are the so-called color management monitors.

The reference monitors 20 are liquid crystal monitors, for example, and may be monitors using an organic EL.

When the reference monitors 20 are liquid crystal monitors, each reference monitor 20 is composed as schematically illustrated in FIG. 2. The reference monitor 20 includes: a liquid crystal panel 201 as a display unit, including an array of R, G, and B color pixels; and a backlight 202 illuminating the liquid crystal panel 201 with white light.

The backlight 202 may be either the direct-lit type with the light source situated on the back of the liquid crystal panel 201, or the edge-lit type in which the light source is situated on the sides of the liquid crystal panel 201, to guide light to the back of the liquid crystal panel 201.

The reference monitor 20 illustrated in FIG. 2 includes the liquid crystal panel 201 and backlight 202, and can be directly used as the monitor 20a in FIG. 1. The monitor 20a can also be the reference monitor 20 in FIG. 2, with the liquid crystal panel 201 removed.

In other words, illumination light projecting onto the object 10 may be light which is emitted from the backlight 202 (light source), and is then transmitted through the liquid crystal panel 201, to be emitted from the monitor 20a. The illumination light projecting onto the object 10 may be light emitted from the backlight 201, without being transmitted through the liquid crystal panel 201.

When the monitor 20a uses an organic EL, the illumination light may be light emitted from the monitor 20a, which displays a white image in the entire area of the monitor 20a.

The camera 30 captures an image of the object 10, and generates and outputs an RGB video signal. A transmitter 40 transmits the video signal to a network 50. A receiver 60 receives the video signal from the network 50. The video signal received by the receiver 60 is supplied to the monitor 20b.

The network 50 may be either the Internet or a narrow area network, such as a local area network (LAN). When the network 50 is the Internet, the transmitter 40 and receiver 60 transmit and receive video signals according to the Internet protocol.

The camera 30 and monitor 20b may be connected to each other by wire or wirelessly, so that the video signal outputted from the camera 30 is directly supplied to the monitor 20b.

The video signal generated by the camera 30 may be supplied to the monitor 20b using a recording medium such as a DVD or an SD card, instead of exchanging the video signal through the network 50. In this case, it is necessary to provide a recording section recording the video signal on a recording medium, and a reproduction section reproducing the video signal from the recording medium, instead of the transmitter 40 and receiver 60.

The monitor 20b displays an image IM10 of the object 10 on the screen of the liquid crystal panel 201, based on the inputted video signal.

Using FIG. 3, a description is given of a concrete configuration of the monitor 20b. As illustrated in FIG. 3, the monitor 20b includes an XYZ color space converter 211, a profile holder 212, an RGB converter 213, and a driver 214 in addition to the liquid crystal panel 201. FIG. 3 does not illustrate the backlight 202.

The profile holder 212 holds a profile PF1 for converting R, G, and B values to X, Y, and Z values, which are tristimulus values in a XYZ color space, as illustrated in FIG. 4. R, G, and B values are values of color signals in a device-dependent color space, and X, Y, and Z values are values of color signals in a device-independent color space (absolute color space).

The profile PF1 can be composed of a three-dimensional look-up table (3DLUT).

Using FIG. 5, a description is given of a way to create the profile PF1. In FIG. 5, the reference monitor 20 sequentially varies R, G, and B values to display an image including plural R, G, and B values.

The camera 30 captures an image displayed on the reference monitor 20, and creates and outputs an RGB video signal. A spectroradiometer 70 measures X, Y, and Z values of the image displayed on the reference monitor 20.

The spectroradiometer 70 is a spectrophotometric colorimeter. The method of measuring X, Y, and Z values is not limited to spectrophotometry. The spectroradiometer 70 only needs to measure X, Y, and Z values of the image displayed on the reference monitor 20, and can be substituted with a tristimulus colorimeter, for example.

The camera 30 and spectroradiometer 70 capture only light of the image displayed on the reference monitor 20, so that external light is prevented from being exposed on the reference monitor 20, the camera 30, and the spectroradiometer 70.

The R, G, and B values outputted from the camera 30 and the X, Y, and Z values outputted from the spectroradiometer 70 are inputted into a collector 80. The collector 80 stores the plural R, G, and B values and X, Y, and Z values in association with each other.

The profile creator 90 selects combinations necessary for the profile PF1, out of the combinations of R, G, and B values and X, Y, and Z values which are collected and stored, thus creating the profile PF1 illustrated in FIG. 4.

When the collector 80 does not include a combination necessary for the profile PF1, the profile creator 90 may be configured to create the necessary combination by interpolation, using at least two combinations included in the collector 80.

The processes of displaying the image including sequentially varying R, G, and B values on the reference monitor 20, collecting combinations of R, G, and B values and X, Y, and Z values by the collector 80, and creating the profile PF1 by the profile creator 90, may be automated by software.

Instead of displaying the image including plural R, G, and B values on the reference monitor 20, a print of plural color patches can be used. However, it is complicated to prepare a print with a large number of color patches. In the case of using such a print, it is necessary to devise the method of illumination.

When the reference monitor 20 is used, it is easy to properly set R, G, and B values and sequentially vary images in colors selected from a large number of colors. The light emitted from the reference monitor 20 serves as illumination light, and it is therefore unnecessary to devise a method of illumination.

The method of creating the profile PF1 as illustrated in FIG. 5, is easier than the method of creating the profile PF1 using a print of color patches, and can create highly accurate 3DLUT.

In the example illustrated in FIG. 4, each of R, G, and B values is 8-bit. Apparent from FIG. 4, the combinations of R, G, and B values and X, Y, and Z values in the profile PF1 are discrete. The profile PF1 therefore has a size smaller than that of a profile holding all the combinations of R, G, and B and X, Y, and Z values.

Returning to FIG. 3, the XYZ color space converter 211 converts the inputted R, G, and B values to X, Y, and Z values with reference to the profile PF1 held in the profile holder 212. The X, Y, and Z values are inputted to the RGB converter 213.

The XYZ color space converter 211 includes an interpolator 2110. Since the combinations of R, G, and B values and X, Y, and Z values in the profile PF1 are discrete, in some cases the inputted R, G, and B values are not held in the profile PF1. In such a case, the X, Y, and Z values corresponding to the inputted R, G, and B values cannot be directly obtained.

When the inputted R, G, and B values are not held in the profile PF1, the interpolator 2110 interpolates X, Y, and Z values using at least two combinations of X, Y, and Z values held by the profile PF1. Accordingly, even when the inputted R, G, and B values are not held in the profile PF1, X, Y, and Z values corresponding to the same can be obtained.

The RGB converter 213 converts the inputted X, Y, and Z values into R, G, and B values that are appropriate for the monitor 20b. Since R, G, and B values are values of color signal in a device-dependent space, R, G, and B values that can represent X, Y, and Z values in a device-independent space depend on each monitor.

The R, G, and B values outputted from the RGB converter 213 are different from the R, G, and B values inputted to the monitor 20b, and are indicated by R', G', and B' values. R', G', and B' values vary from monitor to monitor.

The RGB converter 213 converts the X, Y, and Z values to R', G', and B' values using a 3 by 3 matrix, for example. The RGB converter 213 may convert the X, Y, and Z values to R', G', and B' values using the 3DLUT.

The R', G', and B' values outputted from the RGB converter 213 are inputted to the driver 214. The driver 214 drives the liquid crystal panel 201 to display an image of the object 10 on the liquid crystal panel 201, based on an RGB signal including the inputted R', G', and B' values.

In FIG. 1, the observer sees colors reflected from the object 10 illuminated by illumination light from the backlight 202. The image IM10 of the object 10 displayed on the screen of the monitor 20b can be considered as a transparent object illuminated by illumination light from the backlight 202. The observer looking at the image IM10 therefore sees transmitted colors of the image IM10.

The reflected light (reflected colors) is the result of multiplying the light spectrum of the light source by a spectral reflectivity of the object, and the transmitted light (transmitted color) is the result of multiplying the light spectrum of the light source by a spectral transmittance of the transparent object.

The liquid crystal monitor adjusts the spectral transmittance of light from the backlight 202, which is the same light source as the illumination light used to capture the image of the object, through configuration of the shade of each color pixel of R, G, and B. Accordingly, the colors reflected on the object 10 are not greatly different from the transmitted colors of the image IM10, and can be considered to be substantially the same.

According to the aforementioned configuration and principle, the image IM10 of the object 10 is displayed on the screen of the monitor 20b in substantially the same colors as the colors of the object visually recognized by the observer.

The configuration illustrated in FIG. 1 only needs to include the normal camera 30, generating an RGB video signal and the normal monitors 20a and 20b (the reference monitors 20) displaying RGB video signal, and can be implemented at a low cost.

The configuration of the monitor (the monitor 20b), according to the first embodiment described above, is described again below. The profile holder 212 holds the profile PF1, representing the correspondence relationship between R, G, and B values, which are obtained by displaying an image including plural R, G, and B values on the reference monitor 20, and capturing an image of the displayed image with the camera 30 and measured X, Y, and Z values of the displayed image.

The XYZ color space converter 211 converts first R, G, and B values in an RGB signal generated by capturing an image of the object 10 with the camera 30 to first X, Y, ad Z values, based on the profile PF1.

In this process, the object 10 is illuminated with illumination light emitted from the reference monitor 20 or the light source (backlight 202) included in the reference monitor 20.

The RGB converter 213 converts the first X, Y, and Z values to second R, G, and B values appropriate for the subject monitor 20b, as the reference monitor 20. The driver 214 drives the display unit (liquid crystal panel 201) of the subject monitor 20b to display an image of the object 10 on the display unit, based on an RGB signal including the second R, G, and B values.

The video signal display method according to the first embodiment described above is described again below. The object 10 is illuminated with light, emitted from the first monitor 20a as the reference monitor 20 or light emitted from the light source (backlight 202), and is included in the first monitor 20a as illumination light.

In this state, the camera captures an image of the object 10 and generates an RGB video signal. The generated video signal is supplied to the second monitor 20b as the reference monitor 20.

The second monitor 20b holds the profile PF1. The second monitor 20b converts the first R, G, and B values to the first X, Y, and Z values, based on the profile PF1.

The second monitor 20b converts the first X, Y, and Z values to second R, G, and B values appropriate for the second monitor 20b. The second monitor 20b to display an image of the object 10 on the display unit (liquid crystal panel 201) is based on the RGB signal, including the second R, G, and B values.

Second Embodiment

A description is given of the configuration of the monitor 20b in a second embodiment, using FIG. 6. In FIG. 6, illustration of the backlight 202 is omitted. The entire configuration to capture an image of the object 10 with the camera 30, and to supply the generated video signal to the monitor 20b, is the same as that of FIG. 1.

In FIG. 6, the RGB converter 221 converts the inputted R, G, and B values to the R', G', and B' values with reference to a profile PF2 (see FIG. 7), held by a profile holder 222.

In the monitor 20b, according to the first embodiment illustrated in FIG. 3, the inputted R, G, and B values are converted into X, Y, and Z values, which are then converted to R', G', and B' values appropriate for the monitor 20b.

In the monitor 20b, according to the second embodiment, the inputted R, G, and B values are converted into R', G', and B' values appropriate for the monitor 20b, with reference to the profile PF2 illustrated in FIG. 7. The RGB converter 221 corresponds to an integrated combination of the XYZ color space converter 211, and the RGB converter 213 in FIG. 3.

The profile PF2, illustrated in FIG. 7, can be created by converting the X, Y, and Z values in the profile PF1, illustrated in FIG. 4, into R', G', and B' values through a 3 by 3 matrix, for example, in a similar manner to the RGB converter 213.

The RGB converter 221 includes an interpolator 2210. When the inputted R, G, and B values are not held in the profile PF2, the interpolator 2210 interpolates the R', G', and B' values using at least two combinations of values of R', G', and B' held by the profile PF2.

The values of R', G', and B' outputted from the RGB converter 221 are inputted into the driver 214. The driver 214 drives the liquid crystal panel 201 to display an image of the object 10 on the liquid crystal panel 201, based on an RGB signal including the inputted R', G', and B' values.

The configuration of the monitor (the monitor 20b), according to the second embodiment described above, is described again below. The profile holder 222 holds the profile PF2, representing the correspondence relationship between the R, G, and B values of the RGB signal, generated by displaying a similar image to that of the first embodiment on the reference monitor 20, and capturing an image of the displayed image with the camera 30 and the R, G, and B values obtained by converting the measured X, Y, and Z values of the displayed image.

The conversion of the X, Y, and Z values to the R, G, and B values is conversion of X, Y, and Z values to R, G, and B values appropriate for the subject monitor 20b as the reference monitor 20.

The RGB converter 221 converts first R, G, and B values of an RGB signal generated by capturing an image of the object 10 with the camera 30 to second R, G, and B values, appropriate for the subject monitor 20b, based on the profile PF2.

In this process, the object 10 is illuminated with light emitted from the reference monitor 20, or light emitted from the light source (backlight 202) included in the reference monitor 20 as illumination light.

The driver 214 drives the display unit (liquid crystal panel 201) of the subject monitor 20b to display an image of the object 10 on the display unit, based on the RGB signal, including the second R, G, and B values.

The video signal display method, according to the second embodiment described above is described again below. The object 10 is illuminated with light emitted from the first monitor 20a as the reference monitor 20 or light emitted from the light source (backlight 202) included in the first monitor 20a as illumination light.

In this state, the camera 30 captures an image of the object 10 and generates an RGB video signal. The generated video signal is supplied to the second monitor 20b as the reference monitor 20.

The second monitor 20b holds the profile PF2. The second monitor 20b converts the first R, G, and B values to the second R, G, and B values appropriate for the second monitor 20b. The second monitor 20b displays an image of the object 10 on the display unit (liquid crystal panel 201) based on the RGB signal, including the second R, G, and B values.

As described above, according to the monitors of the first and second embodiments, colors of an object displayed using a normal camera are substantially equal to colors of the object visually recognized by the observer. According to the methods of displaying the video signal of the first and second embodiments, colors of an object displayed using a normal camera and a normal monitor are substantially equal to colors of the object visually recognized by the observer.

In the first and second embodiments, when the color temperature of the light 20IL emitted from the monitor 20a changes, the colors of the image IM10 of the object 10 displayed on the monitor 20b changes. The color temperature of the light 20IL may be changed in purpose.

The first and second embodiments are suitably used when the colors of the object 10 need to be confirmed at a location distant from where the object 10 is located.

The present invention is not limited to each embodiment described above, and can be changed in various ways without departing from the scope of the invention.

What is claimed is:

1. A monitor comprising:
   a profile holder configured to hold a profile representing the correspondence relationship between R, G, and B values of an RGB signal generated by displaying an image including a plurality of R, G, and B values on a reference monitor and capturing an image of the displayed image with a camera, and X, Y, and Z values which are measurements of tristimulus values of the displayed image in an XYZ color space;
   an XYZ color space converter configured to convert to first X, Y, and Z values based on the profile, first R, G, and B values of an RGB signal generated by capturing an image of an object with the camera, while illuminating the object with only light emitted from the reference monitor, or only light emitted from a light source of the reference monitor as illumination light, without illuminating the object with external light;
an RGB converter configured to convert the first X, Y, and Z values to second R, G, and B values appropriate for a subject monitor as the reference monitor; and
a driver configured to drive a display unit of the subject monitor to display an image of the object based on the RGB signal including the second R, G, and B values on the display unit.

2. The monitor according to claim 1, wherein the profile includes combinations of R, G, and B values and X, Y, and Z values discretely, the monitor further comprising:
an interpolator configured to interpolate X, Y, and Z values not included in the profile.

3. A monitor comprising:
a profile holder configured to hold a profile representing the correspondence relationship between R, G, and B values of an RGB signal generated by displaying an image including a plurality of R, G, and B values on a reference monitor and capturing an image of the displayed image with a camera, and R, G, and B values which are appropriate for a subject monitor as a reference monitor and are obtained by converting the X, Y, and Z values that are measurements of tristimulus values of the displayed image in an XYZ color space;
an RGB converter configured to convert to second R, G, and B values appropriate for the subject monitor based on the profile, first R, G, and B values of an RGB signal generated by capturing an image of an object with the camera, while illuminating the object with only light emitted from a reference monitor, or only light emitted from a light source of the reference monitor as illumination light, without illuminating the object with external light; and
a driver configured to drive a display unit of the subject monitor to display an image of the object based on the RGB signal including the second R, G, and B values on the display unit.

4. A video signal display method, comprising:
generating an RGB video signal by capturing an image of an object with a camera, while illuminating the object with only light emitted from a first monitor as a reference monitor, or only light emitted from a light source of the first monitor as illumination light, without illuminating the object with external light;
supplying the generated video signal to a second monitor as the reference monitor;
holding a profile representing the correspondence relationship between R, G, and B values of an RGB signal generated by displaying an image including a plurality of R, G, and B values on the reference monitor and capturing an image of the displayed image with the camera, and X, Y, and Z values which are measurements of tristimulus values of the displayed image in an XYZ color space by the second monitor;
converting first R, G, and B values of the video signal to first X, Y, and Z values based on the profile by the second monitor;
converting the first X, Y, and Z values to second R, G, and B values appropriate for the second monitor by the second monitor; and
displaying an image of the object based on the RGB signal including the second R, G, and B values by the second monitor.

5. The video signal display method according to claim 4, wherein
the reference monitor is a liquid crystal monitor including a liquid crystal panel and a backlight as a light source emitting light which is to be transmitted through the liquid crystal panel, and
the object is illuminated with light which is emitted from the backlight and transmitted through the liquid crystal panel or light emitted from the backlight and is not transmitted through the liquid crystal panel, as the illumination light.

6. A video signal display method, comprising:
generating an RGB video signal by capturing an image of an object with a camera, while illuminating the object with only light emitted from a first monitor as a reference monitor, or only light emitted from a light source of the first monitor as illumination light, without illuminating the object with external light;
supplying the generated video signal to a second monitor as the reference monitor;
holding a profile representing the correspondence relationship between R, G, and B values of an RGB signal generated by displaying an image including a plurality of R, G, and B values on the reference monitor and capturing an image of the displayed image with the camera, and R, G, and B values which are appropriate for the second monitor and are obtained by converting the X, Y, and Z values that are measurements of tristimulus values of the displayed image in an XYZ color space by the second monitor;
converting the first R, G, and B values of the video signal to second R, G, and B values based on the profile by the second monitor; and
displaying an image of the object based on the RGB signal including the second R, G, and B values by the second monitor.

* * * * *